United States Patent Office 3,233,292
Patented Feb. 8, 1966

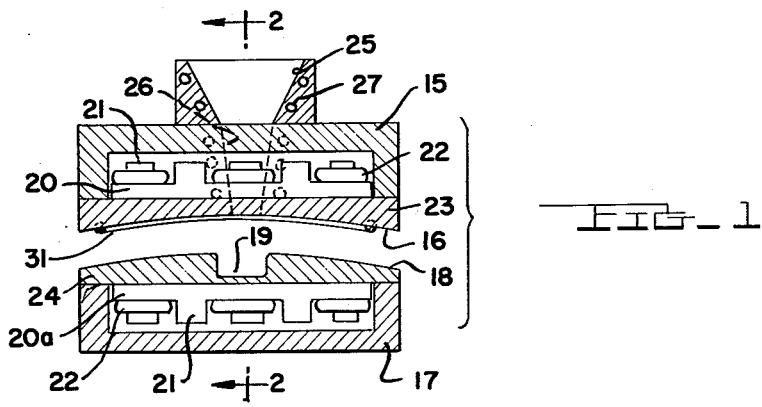
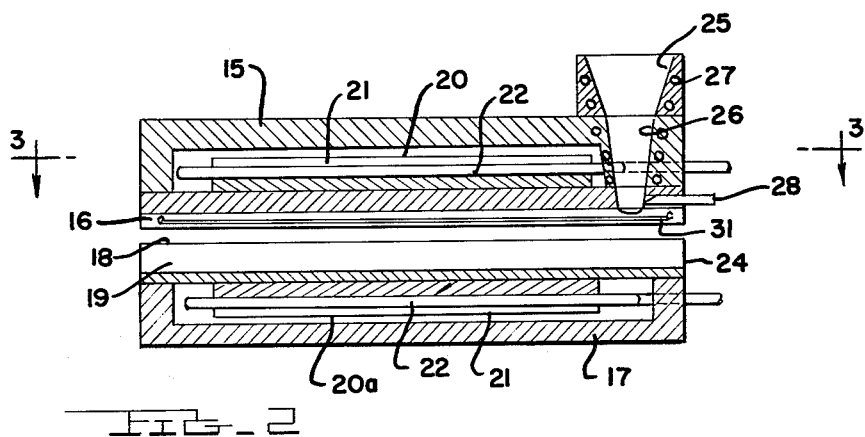
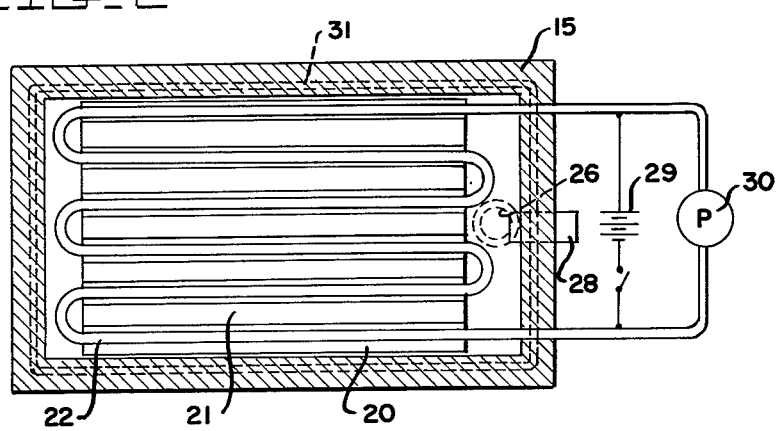

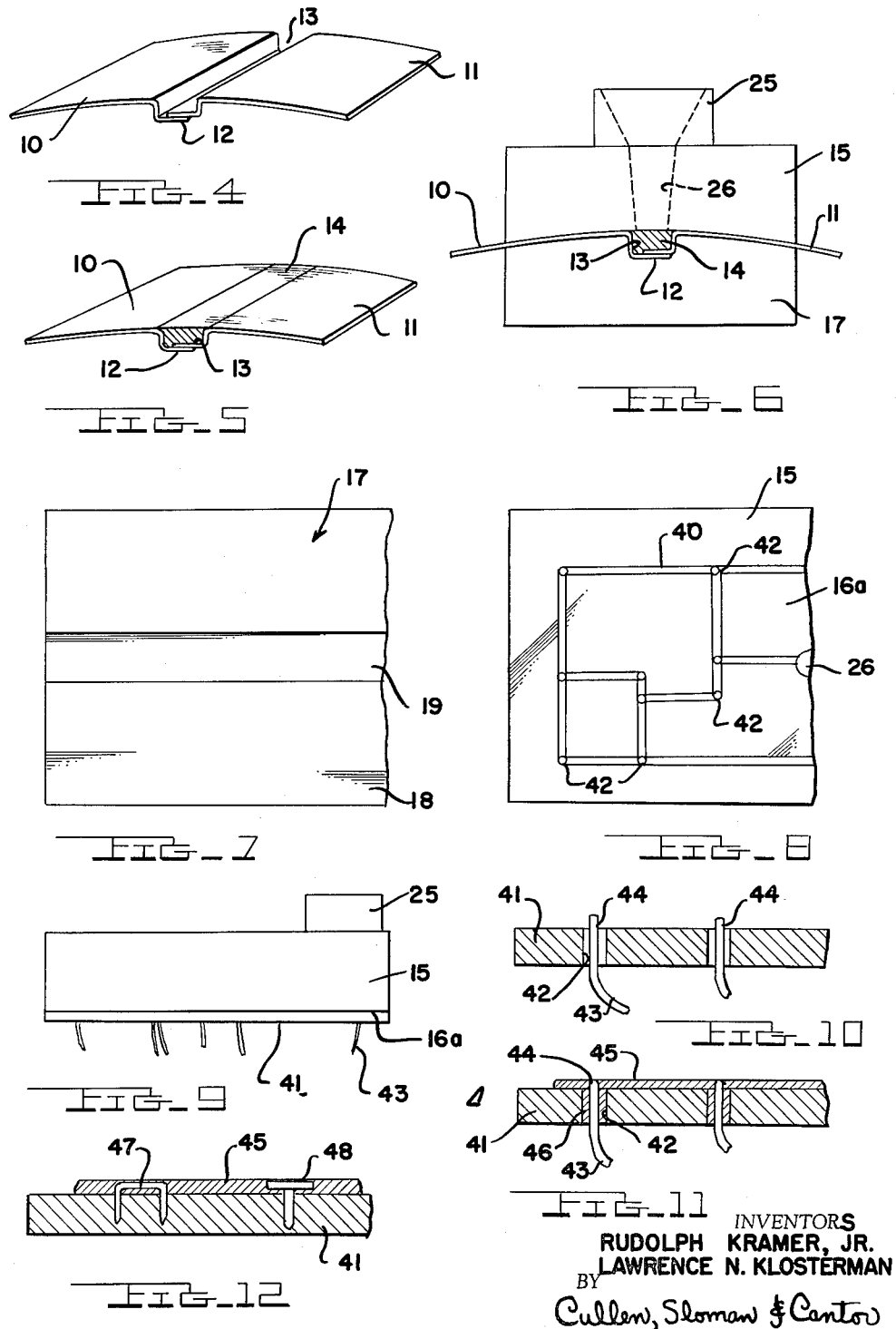

3,233,292
APPARATUS FOR APPLYING CASTABLE
MATERIAL TO A SHEET
Rudolph Kramer, Jr., 27353 Lorraine, Warren, Mich., and
Lawrence N. Klosterman, 1040 N. Renaud, Grosse
Pointe Woods 36, Mich.
Filed June 22, 1962, Ser. No. 204,386
2 Claims. (Cl. 22—58)

This invention relates to apparatus for applying castable material to a sheet.

In the automotive industry, it is common to join together adjacent edges of sheet metal body parts by first bending the edges to form a groove, then spot welding the edges at the groove, thereafter filling the groove with solder or the like to conceal the joint and, last, grinding and filing the soldered joint to the smooth contours of the body. Such soldering is manually performed with a heating torch to melt the solder into the groove of the sheet metal. This manual method is time consuming, expensive, and frequently, the quality of the soldered joint is poor, particularly as to the ground and filed exposed surface.

Hence, it is an object of this invention to provide apparatus for filling grooves at the joints of sheets of sheet metal rapidly, automatically, with a minimum of labor, and producing high quality fillings which accurately conform to the desired exposed surface contours with a minimum of additional filing or grinding.

A further object of this invention is to provide such apparatus, wherein the grooved sheet metal forms one mold half and a mold cover forms a second mold half, and means is provided for rapidly heating the sheet metal and the cover for rapidly filling the groove with molten castable material, and also means is provided for rapidly chilling the sheet metal and mold cover to solidify the castable material into smooth finished shape, thereby substantially reducing surface grinding or filing.

In developing the concept herein, we have discovered that the solutions to the problems encountered are also applicable to the problems encountered in the electrical industry in forming printed circuits. We have discovered that the apparatus herein can be used to cast a printed circuit, formed of solder or the like, upon a carrier sheet, made of some insulated material, and simultaneously join the printed circuit to various wires to be connected thereto.

These and other objects and advantages of this invention will become apparent upon reading the following description, of which the attached drawings form a part.

In these drawings:

FIG. 1 is a cross-sectional end view of the apparatus herein.

FIG. 2 is a cross-sectional view taken in the direction of arrows 2—2 of FIG. 1, and FIG. 3 is a schematic view taken in the direction of arrows 3—3 of FIG. 2.

FIG. 4 is a fragmentary view, in perspective, of the groove formed at the joint of two pieces of sheet metal, and FIG. 5 is a view similar to FIG. 4, but shows the groove filled.

FIG. 6 is an end view, similar to FIG. 1, showing the molten material being placed in the groove.

FIG. 7 is a top view of a portion of the lower support plate.

FIG. 8 is a plan view of the mold cover contact surface formed for casting electrical, printed type, circuits.

FIG. 9 is a view showing the mold cover in contact with a carrier sheet.

FIG. 10 is an enlarged cross-sectional view of the electrical circuit, carrier sheet showing the wires loosely applied thereto, and FIG. 11 is a view, similar to FIG. 10, showing a printed circuit cast upon the carrier sheet and joined to the wires.

FIG. 12 shows, in cross-section, anchoring means for anchoring parts of the printed circuit to the carrier sheet.

APPARATUS FOR FILLING GROOVES IN SHEET
METAL (FIGS. 1–7)

FIGS. 4 and 5 show two pieces of sheet metal 10 and 11 whose edges are joined together, as by spot welding, at 12 to form a portion of a body of an automobile or some such similar sheet metal structure. The adjoining edges of the sheet metal pieces are bent into a groove 13, which groove is filled with solder or some such similar castable material. The exposed surface of filling 14 is shaped to the surface contours of the sheet metal so that the joint between the pieces of metal is concealed and the sheet metal is rigidified along the joint.

The apparatus for applying the castable material to the groove comprises a mold cover 15 having a sheet metal contact surface 16 and a lower support plate 17, having a sheet metal contacting support surface 18 formed with a groove 19 to receive the bottom surface of groove 13 in the sheet metal.

Preferably, the mold cover and the lower support plate each extend the full length of the groove. However, the cover and plate may be shorter than the groove, the apparatus then operating incrementally to fill the groove in short sections.

Arranged inside of the mold cover 15 and the support plate 17 are induction heaters 20 and 20a. These heaters are formed of heavy cast iron pole pieces 21 surrounded by electrical coils 22 which coils are formed of hollow tubing so that they not only carry electricity for heating purposes, but they also carry coolants for cooling purposes.

The contact surfaces of the mold cover and the support plate are preferably formed of plates 23 and 24 of a highly conductive metal, such as aluminum.

The mold cover, at least at one location, and if necessary at several locations, is provided with a hopper 25 within which powdered, castable metal, such as powdered solder, is placed. The hopper communicates through a passageway 26 to the contact surface 16 and opens into the groove. The hopper and passageway are surrounded by heating coils 27 for melting the metal in the hopper. A blade 28 is arranged below the passage 26 to reciprocate across the open bottom of the passage to cut the metal in the passageway 26 from the metal in the filled groove.

The induction heater coils 22 are connected to an electrical power source 29 through a suitable switch arrangement for turning the heater on and off and also are connected to a coolant supply and pump 30 which continuously pumps coolant fluid through the coils.

A resilient ring seal 31 is attached to surface 16 for sealing the mold cover to the sheet metal.

PROCESS FOR FILLING GROOVES IN
SHEET METAL

After the sheet metal pieces have been spot welded together, they are placed upon the support surface 18 of the lower support plate 17 with the groove 13 positioned in the support surface groove 19. The hopper 25 is filled with particles of the castable material. The sheet metal groove 13 is tinned manually either before or after it is placed upon the support plate, by simply brushing upon it flux or a mixture of flux plus particles of solder. Thereafter, the mold cover is closed against the sheet metal and is sealed thereto by a ring seal 28.

Next, the induction heater is operated by connecting it to the electrical power source 29, thereby, rapidly melting the castable metal in the hopper and causing it to flow into the groove 13. The metal may be gravity fed, or a suitable pressure applying means (not shown) may be provided in the hopper to pressure-feed the metal into the groove.

Simultaneously, the induction heater 20a in the support plate is operated to heat the lower surface of the sheet metal. Thus, the sheet metal itself forms the heated bottom mold half. Because the heat is applied to the bottom of the sheet metal by the support plate induction heater and to the top of the sheet metal by the cover induction heater, the sheet metal is uniformly heated almost instantaneously.

When the groove is filled with the molten metal, this taking only a few seconds or less, the induction heater is disconnected from its electrical power source, and the coolant, which flows through the coils 22 at all times, rapidly chills the molten metal and the sheet metal, thus almost instantaneously solidifying the metal filling.

Next, the cover is opened and the sheet metal is removed. The filling is completed and conforms to the contours of the sheet metal surface. When the cover and support are equal in length to the groove, no further steps are required. However, where these are shorter than the length of the groove, the operation is repeated for the next section of the groove.

CASTING ELECTRICAL, PRINTED TYPE, CIRCUITS (FIGS. 8–12)

To cast printed circuits, the sheet contacting surface 16a of the upper mold cover 15 is provided with grooves 40 arranged in the pattern of the circuit. The metal is cast directly upon a conventional carrier sheet 41, normally made of an insulating type material.

Openings 42 are formed in the sheet at predetermined locations corresponding to points where electrical wiring would normally be soldered to the printed circuit. Wires 43 are inserted through the openings with their ends 44 extending above the surface of the sheet to form projections. Preferably, the wire ends 44 are tinned prior to insertion through the openings.

When the mold cover is applied to the surface of the sheet 41, the induction heater is turned on to cause molten solder or the like metal to flow through the pattern grooves 40 and to cast the metal directly upon the sheet surface, simultaneously surrounding and joining to the wire ends 44, thus eliminating the need to later solder wires to the printed circuit. No heated lower support plate is required here. Also, the solder 45 fills the openings to form plugs or stakes 46 to anchor the circuit to the sheet. Where the solder extends a considerable distance upon the sheet surface without being connected to a wire, it is desirable to additionally stake it to the sheet by using a common mechanical fastener, such as a staple 47 or a rivet or tack 48 applied to the sheet prior to casting, so that it is surrounded by and bonded to the solder.

After the solder is cast upon the sheet surface in the circuit pattern, the induction heater is turned off and coolant which flows through the coils at all times rapidly chills the molten metal and solidifies it.

The heating and application of the molten metal to the sheet is extremely rapid, usually within seconds, and practically instantaneous, and the chilling is likewise practically instantaneous. Hence, the heat of the molten metal and cover does not damage the carrier sheet 41.

This invention may be further developed within the scope of the following attached claims. Accordingly, it is desired that the foregoing description be read as being merely illustrative of an operative embodiment of this invention and not in a strictly limiting sense.

We claim:

1. An apparatus for casting a castable material in a predetermined pattern upon a sheet comprising a mold half having an open cavity; a surface plate formed of a highly heat conductive metal covering the cavity with the plate having an exposed, sheet contacting face and an opposite, inner face, with said exposed face having the pattern to be cast formed therein; an induction heater arranged within said cavity, said heater comprising a pole piece formed of a thick, iron plate arranged in face to face contact with said surface plate inner face, with the opposite face of said iron plate being formed with a plurality of substantially parallel, spaced apart grooves; a continuous electrically conductive tube, forming a continuous heating coil, arranged within said grooves in contact with the bases of said grooves; means for continuously flowing a coolant through said tube and means for selectively connecting said tube to an electrical power source for electrically energizing said tube for heating the surface plate and thus the sheet, during casting and for de-energizing said tube for cooling the sheet; a second mold half aligned with said sheet contacting face for supporting a sheet against said sheet contacting face for casting.

2. A construction as defined in claim 1, and said second mold half also having an open cavity, covered by a surface plate having an exposed face for supporting said sheet with an induction heater identical to the first mentioned induction heater arranged within its cavity, wherein the tubes of both induction heaters may be energized simultaneously to heat both faces of said sheet during casting and may be deenergized to simultaneously cool both faces of said sheet.

References Cited by the Examiner

UNITED STATES PATENTS

| | | | |
|---|---|---|---|
| 1,104,927 | 7/1914 | Pettis. | |
| 2,270,166 | 1/1942 | Hiensch et al. | 29—155.5 |
| 2,317,597 | 4/1943 | Ford et al. | 18—38 |
| 2,321,731 | 6/1943 | Bouton et al. | 22—203 |
| 2,540,242 | 2/1951 | Brennan | 22—203 |
| 2,953,826 | 9/1960 | Larsh. | |
| 3,160,930 | 12/1964 | Fisher | 22—71 |

J. SPENCER OVERHOLSER, *Primary Examiner.*

JOHN F. CAMPBELL, WILLIAM J. STEPHENSON, *Examiners.*